US011894187B2

(12) United States Patent
Wynkoop

(10) Patent No.: US 11,894,187 B2
(45) Date of Patent: Feb. 6, 2024

(54) SYSTEMS AND METHODS FOR MULTI-STABLE SOLENOID

(71) Applicant: HUSCO AUTOMOTIVE HOLDINGS LLC, Waukesha, WI (US)

(72) Inventor: Trevor Wynkoop, Waukesha, WI (US)

(73) Assignee: HUSCO Automotive Holdings LLC, Waukesha, WI (US)

(*) Notice: Subject to any disclaimer, the term of this patent is extended or adjusted under 35 U.S.C. 154(b) by 137 days.

(21) Appl. No.: 16/999,916

(22) Filed: Aug. 21, 2020

(65) Prior Publication Data

US 2021/0057136 A1 Feb. 25, 2021

Related U.S. Application Data

(60) Provisional application No. 62/890,300, filed on Aug. 22, 2019.

(51) Int. Cl.
*H01F 7/08* (2006.01)
*H01F 7/16* (2006.01)
*H01F 7/18* (2006.01)

(52) U.S. Cl.
CPC .......... *H01F 7/1615* (2013.01); *H01F 7/088* (2013.01); *H01F 7/1805* (2013.01)

(58) Field of Classification Search
CPC ..... F16F 15/035; F16F 2222/06; H01F 7/088; H01F 7/121; H01F 7/1615; H01F 2007/1669
See application file for complete search history.

(56) References Cited

U.S. PATENT DOCUMENTS

| | | | |
|---|---|---|---|
| 3,385,984 A | 5/1968 | O'Regan | |
| 4,160,133 A | 7/1979 | Wiik | |
| 4,517,505 A | 5/1985 | Cunningham | |
| 5,187,398 A | 2/1993 | Stuart | |
| 5,814,907 A | 9/1998 | Bandera | |
| 6,791,442 B1* | 9/2004 | Schmidt | H01F 7/1615 335/266 |
| 8,888,637 B2 | 11/2014 | Kimes | |
| 9,303,699 B2 | 4/2016 | Kimes | |
| 9,371,868 B2 | 6/2016 | Kimes | |
| 9,435,387 B2 | 9/2016 | Kimes | |

(Continued)

FOREIGN PATENT DOCUMENTS

| | | |
|---|---|---|
| CN | 109383470 A | 2/2019 |
| DE | 1253821 A1 | 11/1967 |

(Continued)

OTHER PUBLICATIONS

Van Dam, JRM, et al. "Design of a permanent magnet-biased reluctance valve actuator with integrated eddy current damping." 2019 12th International Symposium on Linear Drives for Industry Applications (LDIA). IEEE, 2019.

(Continued)

*Primary Examiner* — Matthew W Jellett
(74) *Attorney, Agent, or Firm* — Quarles & Brady LLP

(57) ABSTRACT

The present disclosure provides a multi-stable solenoid with one or more magnetic damping rings. In general, the magnetic damping rings provide an increased damping force to an armature of the multi-stable solenoid to ensure efficient operation, reduce detent position overshoot, and reduce an impact force at end positions.

19 Claims, 7 Drawing Sheets

(56) References Cited

U.S. PATENT DOCUMENTS

| | | |
|---|---|---|
| 9,441,708 B2 | 9/2016 | Kimes |
| 9,478,339 B2 * | 10/2016 | Gilmore ................ H01F 7/1615 |
| 9,702,419 B2 | 7/2017 | Essenmacher |
| 9,909,631 B2 | 3/2018 | Essenmacher |
| 11,242,939 B2 * | 2/2022 | Magel ..................... H01F 7/081 |
| 2002/0008603 A1 | 1/2002 | Seale et al. |
| 2003/0102196 A1 | 6/2003 | Wetzel |
| 2011/0248804 A1 | 10/2011 | Wygnanski |
| 2016/0327176 A1 | 11/2016 | Nemoto |
| 2018/0010651 A1 | 1/2018 | Kimes |
| 2018/0038425 A1 | 2/2018 | Kimes |
| 2018/0106304 A1 | 4/2018 | Kimes |
| 2018/0347642 A1 | 12/2018 | Kimes |
| 2019/0170198 A1 | 6/2019 | Kimes |
| 2020/0055509 A1 * | 2/2020 | Stahr ...................... H01F 7/127 |
| 2020/0312509 A1 * | 10/2020 | Mecklenburg ........ H01F 7/1607 |
| 2020/0325959 A1 * | 10/2020 | Sato ........................ F16F 15/03 |

FOREIGN PATENT DOCUMENTS

| | | | |
|---|---|---|---|
| DE | 1514157 A1 | 4/1969 | |
| DE | 102014217738 A1 * | 3/2016 | .............. H01F 7/18 |
| DE | 102014217738 B | 3/2016 | |
| FR | 2612276 A1 | 9/1988 | |
| JP | S6010704 A | 1/1985 | |
| KR | 101922473 B1 | 2/2019 | |
| KR | 20190028923 A | 3/2019 | |

OTHER PUBLICATIONS

European Patent Office. Extended European Search Report for application 20192347.1, dated Jan. 29, 2021. 15 pages.

\* cited by examiner

SYSTEMS AND METHODS FOR MULTI-STABLE SOLENOID

CROSS-REFERENCES TO RELATED APPLICATIONS

The present application is based on and claims priority to U.S. Provisional Patent Application No. 62/890,300, filed on Aug. 22, 2019, which is incorporated herein by reference in its entirety.

BACKGROUND

Generally, solenoids may include an armature that is movable in response to an electromagnetic field generated by energizing a wire coil.

BRIEF SUMMARY

The present disclosure relates generally to solenoids and, more specifically, to multi-stable solenoids with magnetic damping rings. In general, the magnetic damping rings provide stability to the solenoid when an armature thereof is traveling between stable positions by reducing end stop impact force or intermediate position overshoot.

In one aspect, the present disclosure provides a solenoid including a wire coil and an armature having a permanent magnet. The armature is moveable between two or more stable positions in response to selective energization of the wire coil. The solenoid further includes one or more magnetic dampers arranged along a travel path of the armature. The one or more magnetic dampers are configured to generate a magnetic damping force in a direction that opposes movement of the armature.

In one aspect, the present disclosure provides a solenoid including one or more wire coils axially spaced from one another, an armature having a permanent magnet. The armature is moveable between stable positions in response to selective energization of one or more of the one or more wire coils. The solenoid further includes one or more magnetic dampers arranged along a travel path of the armature. The one or more magnetic dampers are configured to generate a magnetic damping force in response to relative movement between the armature and at least one of the one or more magnetic dampers. A direction of the magnetic damping force is opposite to a movement direction of the armature.

The foregoing and other aspects and advantages of the disclosure will appear from the following description. In the description, reference is made to the accompanying drawings which form a part hereof, and in which there is shown by way of illustration a preferred configuration of the disclosure. Such configuration does not necessarily represent the full scope of the disclosure, however, and reference is made therefore to the claims and herein for interpreting the scope of the disclosure.

BRIEF DESCRIPTION OF DRAWINGS

The invention will be better understood and features, aspects and advantages other than those set forth above will become apparent when consideration is given to the following detailed description thereof. Such detailed description makes reference to the following drawings.

DETAILED DESCRIPTION

Figure 1:
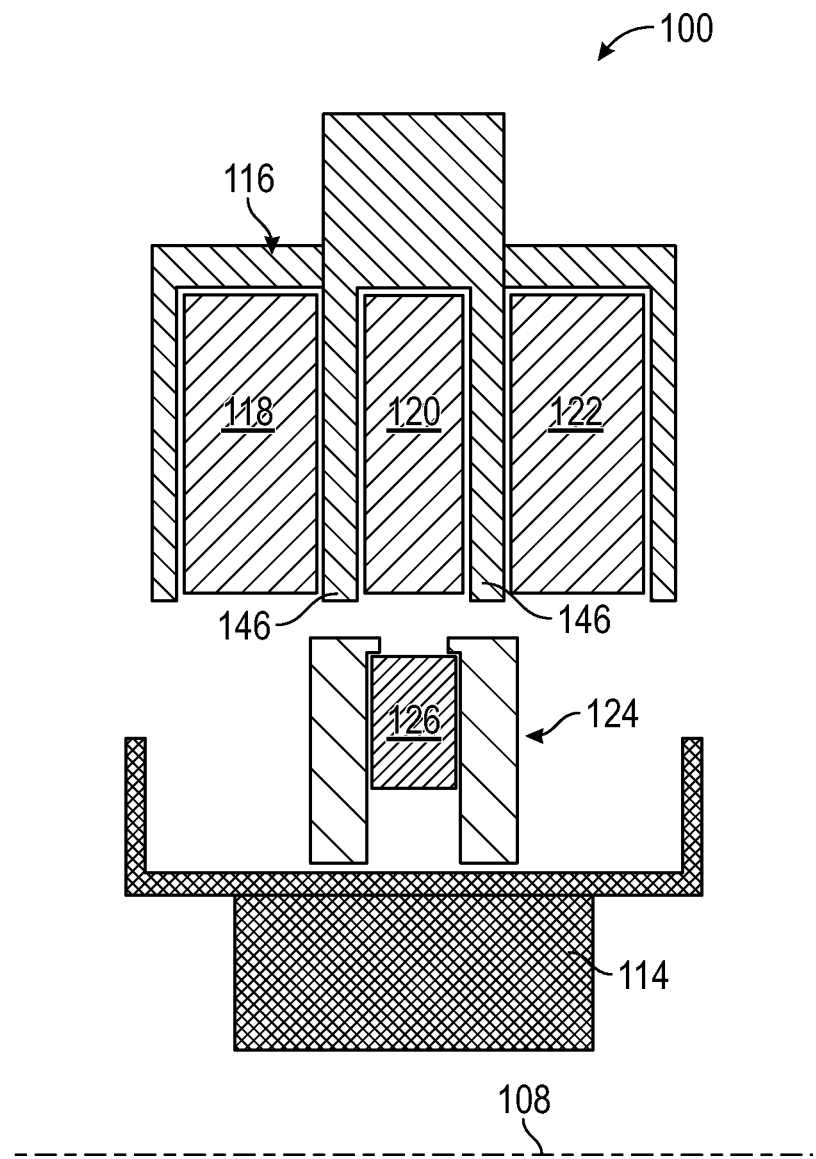
FIG. 1 is a schematic illustration of a conventional multi-stable solenoid according to one aspect of the present disclosure.

Before any aspect of the present disclosure are explained in detail, it is to be understood that the present disclosure is not limited in its application to the details of construction and the arrangement of components set forth in the following description or illustrated in the following drawings. The present disclosure is capable of other configurations and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use aspects of the present disclosure. Various modifications to the illustrated configurations will be readily apparent to those skilled in the art, and the generic principles herein can be applied to other configurations and applications without departing from aspects of the present disclosure. Thus, aspects of the present disclosure are not intended to be limited to configurations shown, but are to be accorded the widest scope consistent with the principles and features disclosed herein. The following detailed description is to be read with reference to the figures, in which like elements in different figures have like reference numerals. The figures, which are not necessarily to scale, depict selected configurations and are not intended to limit the scope of the present disclosure. Skilled artisans will recognize the non-limiting examples provided herein have many useful alternatives and fall within the scope of the present disclosure.

The use herein of the term "axial" and variations thereof refers to a direction that extends generally along an axis of symmetry, a central axis, or an elongate direction of a particular component or system. For example, an axially-extending structure of a component may extend generally along a direction that is parallel to an axis of symmetry or an elongate direction of that component. Similarly, the use herein of the term "radial" and variations thereof refers to directions that are generally perpendicular to a corresponding axial direction. For example, a radially extending structure of a component may generally extend at least partly along a direction that is perpendicular to a longitudinal or central axis of that component. The use herein of the term "circumferential" and variations thereof refers to a direction that extends generally around a circumference or periphery of an object, around an axis of symmetry, around a central axis, or around an elongate direction of a particular component or system.

In general, a multi-stable solenoid may include an armature that is movable between one or more stable positions. For example, the multi-stable solenoid may define two or more stable positions for the armature. The selective movement of the armature between the stable positions (e.g., positions where the armature remains in place while a wire coil is de-energized) may facilitate the engagement or disengagement between the armature and one or more end positions. For example, the armature may be moveable between two end positions and a center position (i.e., a tri-stable solenoid having three stable positions).

Conventional multi-stable solenoids typically suffer from overshoot when the armature is moving from an end position to a center magnetic detent position. That is, the armature may overshoot and displace past the center position or, in some cases, displace past and escape the desired detent position. This overshoot may lead to inefficient operation or render the solenoid inoperable for its given application. In some non-limiting examples, the magnetic damping components may be used to slow down and/or reduce an impact force of an armature when it reaches an end position.

The present disclosures provides systems and methods for a multi-stable solenoid that dampens or controls the amount of overshoot when moving to a detent position. In some aspects, the present disclosure provides a ring solenoid that includes one or more magnetic damping components that prevent or restrict past-detent travel of the armature when traveling to a detent position. The magnetic damping components may be ring-shaped and arranged along a travel path of the armature. In this way, for example, overshoot past the detent position and engagement to an undesired position may be prevented during operation.

FIG. 1 illustrates one non-limiting example of a conventional multi-stable solenoid 100. In some non-limiting examples, the multi-stable solenoid 100 may be ring-shaped (i.e., extend circumferentially around a center axis 108).

In the illustrated non-limiting example, the multi-stable solenoid 100 may include a housing 116. In some non-limiting examples, the housing 116 may be fabricated from a ferromagnetic material. In general, the multi-stable solenoid 100 may include a wire coil configured to selectively generate an electromagnetic force in response to a current applied thereto. In some non-limiting examples, the multi-stable solenoid 100 may include a first wire coil 118, a second wire coil 120, a third wire coil 122, and an armature 124. In some non-limiting examples, the first wire coil 118, the second wire coil 120, and the third wire coil 122 may be formed from a single wire coil that is separated into multiple coil bays that define the first wire coil 118, the second wire coil 120, and the third wire coil 122. In some non-limiting examples, the first wire coil 118, the second wire coil 120, and the third wire coil 122 may be individual wire coils that are wired separately. In any case, the first wire coil 118, the second wire coil 120, and the third wire coil 122 may be arranged within the housing 116 and may be axially separated (i.e., spaced apart in a direction along the center axis 108), with the second wire coil 120 arranged axially between the first wire coil 118 and the third wire coil 122. In some non-limiting examples, the multi-stable solenoid may include more or less than three wire coils or wire coil bays.

The armature 124 may include a permanent magnet 126 arranged at least partially within the armature 124. In some non-limiting examples, the armature 124 may be comprised of one or more ferromagnetic components in addition to the permanent magnet 126. The armature 124 may be arranged within the housing 116 such that a radial air gap exists between a radial end of the housing 116 and the ring armature 124 (i.e., the radial air gap is defined between an outer diameter of the armature 124 and the inner diameter of the housing 116). In the illustrated non-limiting example, the permanent magnet 126 may be axially magnetized. That is, the north and south poles of the permanent magnet 126 may be aligned along, or arranged parallel to, the center axis 108.

Figure 2:
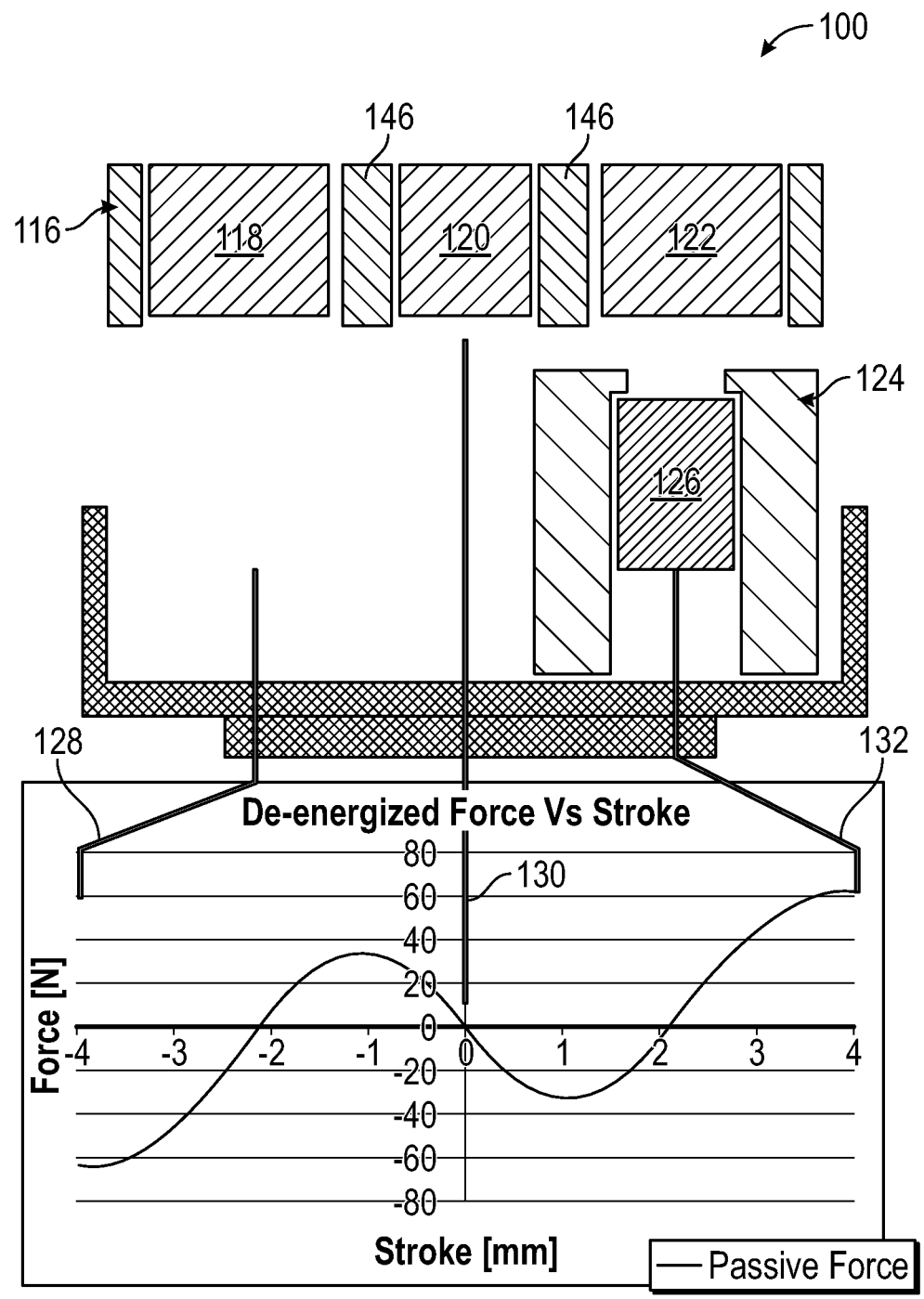
FIG. 2 is a schematic illustration of a portion of the multi-stable solenoid of FIG. 1 and a graph illustrating a force as a function of stroke for a solenoid of the multi-stable solenoid with no current applied to the solenoid.

Referring to FIG. 2, in the illustrated non-limiting example, the armature 124 may be axially movable along a shaft 114 between three different stable positions in response to selective activation of one or more of the first wire coil 118, the second wire coil 120, and the third wire coil 122. For example, the armature 124 may be moveable between a first end position 128, a center magnetic detent position 130, and a second end position 132. The center detent position 130 may be arranged axially between the first end position 128 and the second end position 132. In some non-limiting examples, the multi-stable solenoid 100 may define two or more stable position (e.g., 2, 4, 5, 6, etc.) for the armature 124.

As illustrated in the graph of FIG. 2, the magnetic components within the multi-stable solenoid 100 (e.g., the housing 116) may produce a varying force on the armature 124 due to the magnetic interaction between the permanent magnet 126 and these magnetic components. The passive force vs. stroke curve illustrated in FIG. 2 depicts the amount of force acting on the armature 124 as a function of position between the first end position 128 and the second end position 132, with the first wire coil 118, the second wire coil 120, and the third wire coil 122 all de-energized. In the graph of FIG. 2, a positive force is acting to move the armature 124 to the right (from the perspective of FIG. 2). For example, the first end position 128 may be at negative four millimeters on the x-axis of FIG. 2, the center detent position 130 may be at the origin of FIG. 2, and the second end position 132 may be at positive four millimeters on the x-axis of FIG. 2. In the illustrated non-limiting example, when the armature 124 is at the first end position 128, a negative force (i.e., one that forces the armature 124 to the left from the perspective of FIG. 2) acts on the armature 124 and a positive force greater than this inherent static force is required to move the ring armature 124 toward the center detent position 130.

To facilitate moving the armature 124 along its path between the first end position 128 and the second end position 132, various combinations of the first wire coil 118, the second wire coil 120, and the third wire coil 122 may be selectively energized (i.e., applied with current in a desired direction). For example, one, two, or all of the first wire coil 118, the second wire coil 120, and the third wire coil 122 may be energized at different times to provide a predetermined force in a desired direction on the armature 124 and move it to one of the first end position 128, the center detent position 130, or the second end position 132.

Figure 3:
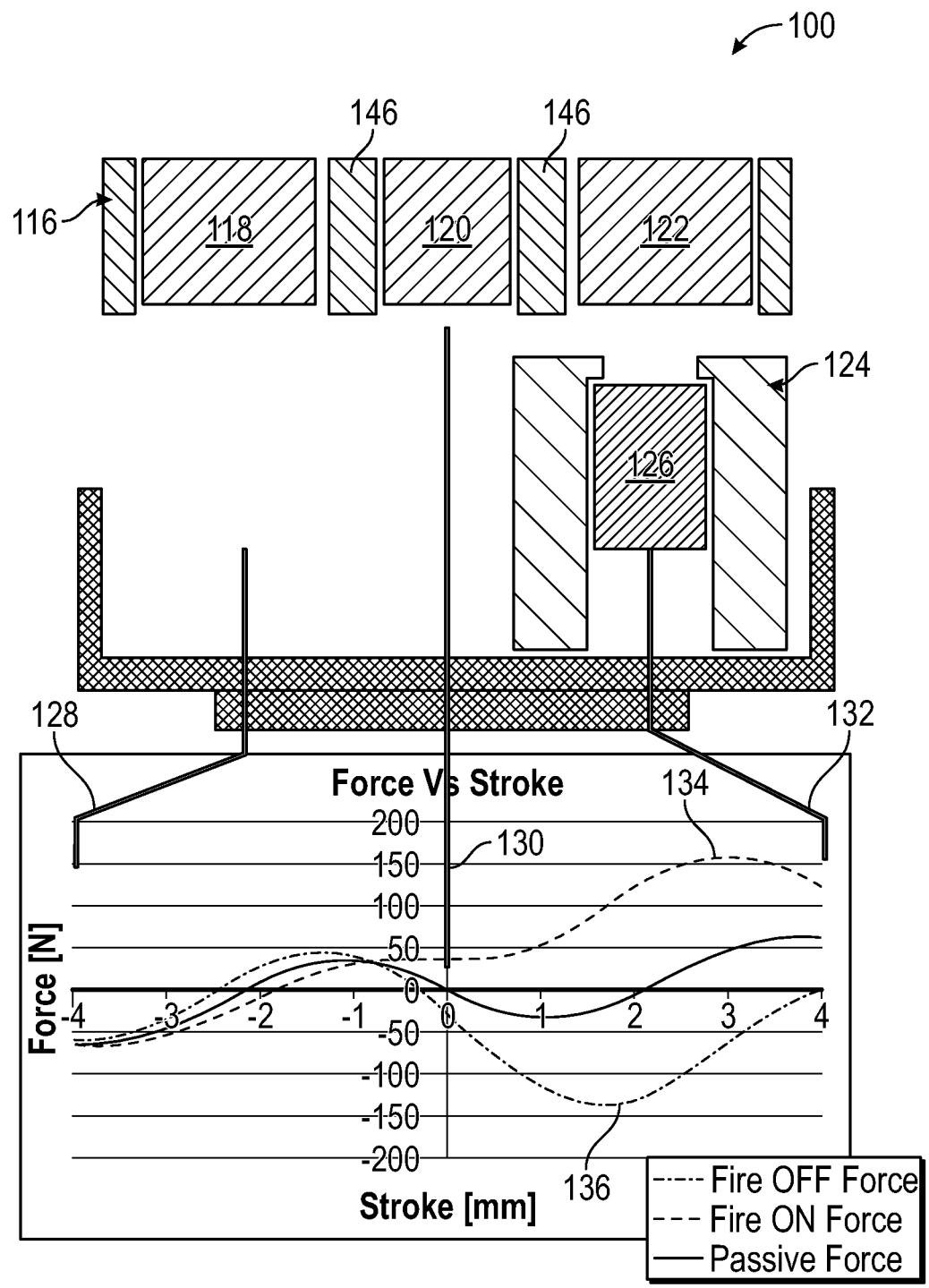
FIG. 3 is a schematic illustration of a portion of the multi-stable solenoid of FIG. 1 and a graph illustrating a force as a function of stroke for a given coil configuration at various firing conditions.

FIG. 3 illustrates two non-limiting examples of a force vs. stroke curve for two firing conditions (i.e., moving the armature 124 between two positions) for a given configuration of the first wire coil 118, the second wire coil 120, and the third wire coil 122. The configuration of the first wire coil 118, the second wire coil 120, and the third wire coil 122 and the current applied thereto may alter the shape and location of the force vs. stroke curve on the y-axis.

In the illustrated non-limiting example, the curve 134 (Fire-ON) illustrates a configuration for firing from the center detent position 130 to the second end position 132. As illustrated in FIG. 3, the force generated is always positive indicating that the armature 124 is forced toward the second end position 132. The curve 136 (Fire-OFF) illustrates a configuration for firing from the second end position 132 to the center detent position 130. As illustrated in FIG. 3, the force generated is always negative all the way to the center detent position 130. The force vs. stroke characteristics of the firing conditions from either the first end position 128 or the second end position 132 to the center detent position 130 may result in undesired overshoot (i.e. travel of the armature past the desired position 130).

Figure 4:
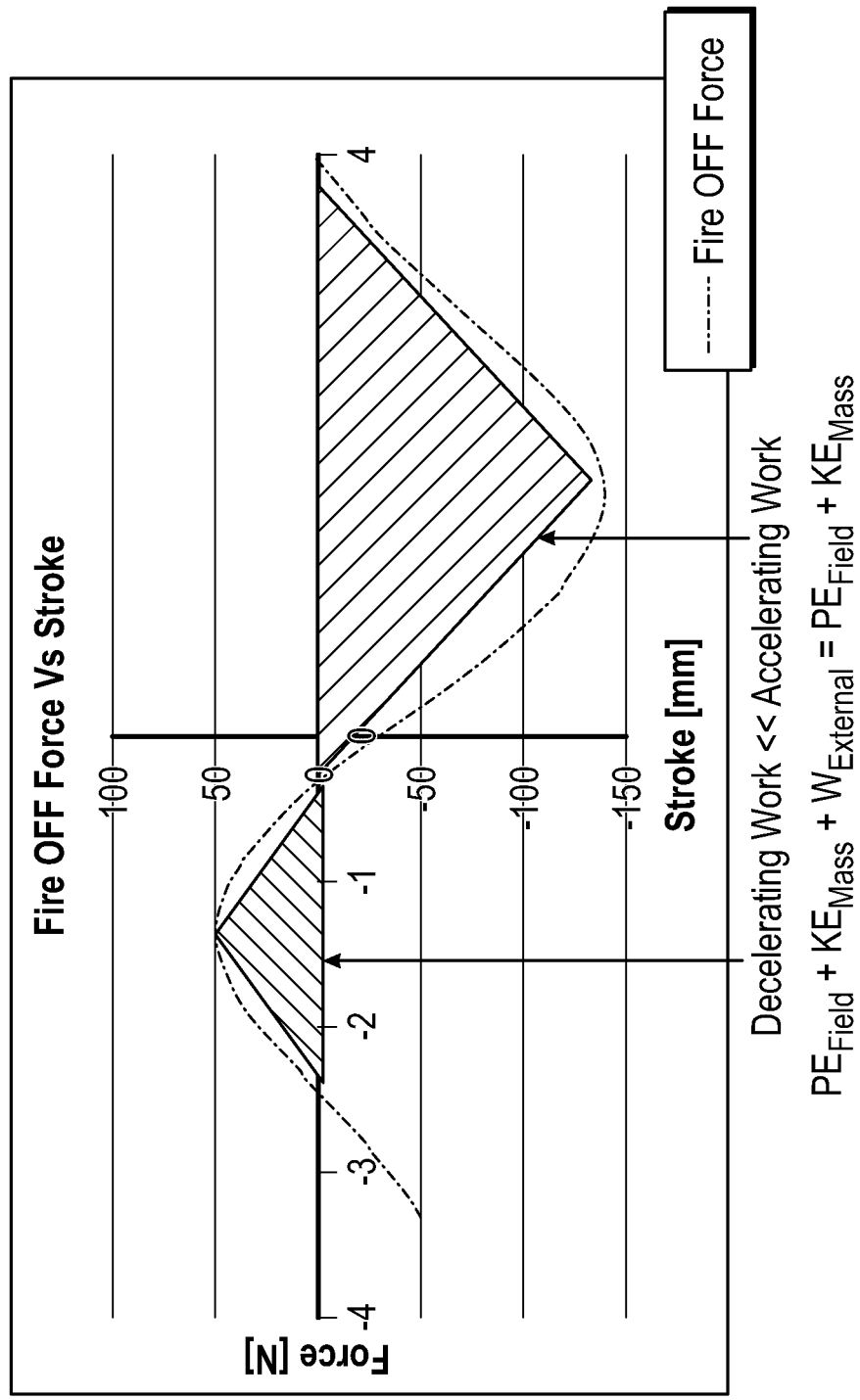
FIG. 4 is a graph illustrating a force as a function of stroke for a given firing condition for the multi-stable solenoid of FIG. 1.

In general, the movement of the ring armature 124 is governed by the conservation of energy. For example, as illustrated in FIG. 4 for the curve 136, the amount of accelerating work done on the armature 124 from the second end position 132 to the center detent position 130 is much greater than the decelerating work done on the armature 124. As such, physics would dictate that the armature 124 may possess enough momentum when it reaches the center detent position 130 to travel past the center detent position 130 and, in some cases, undesirably travel to the next stable position.

Figure 5:
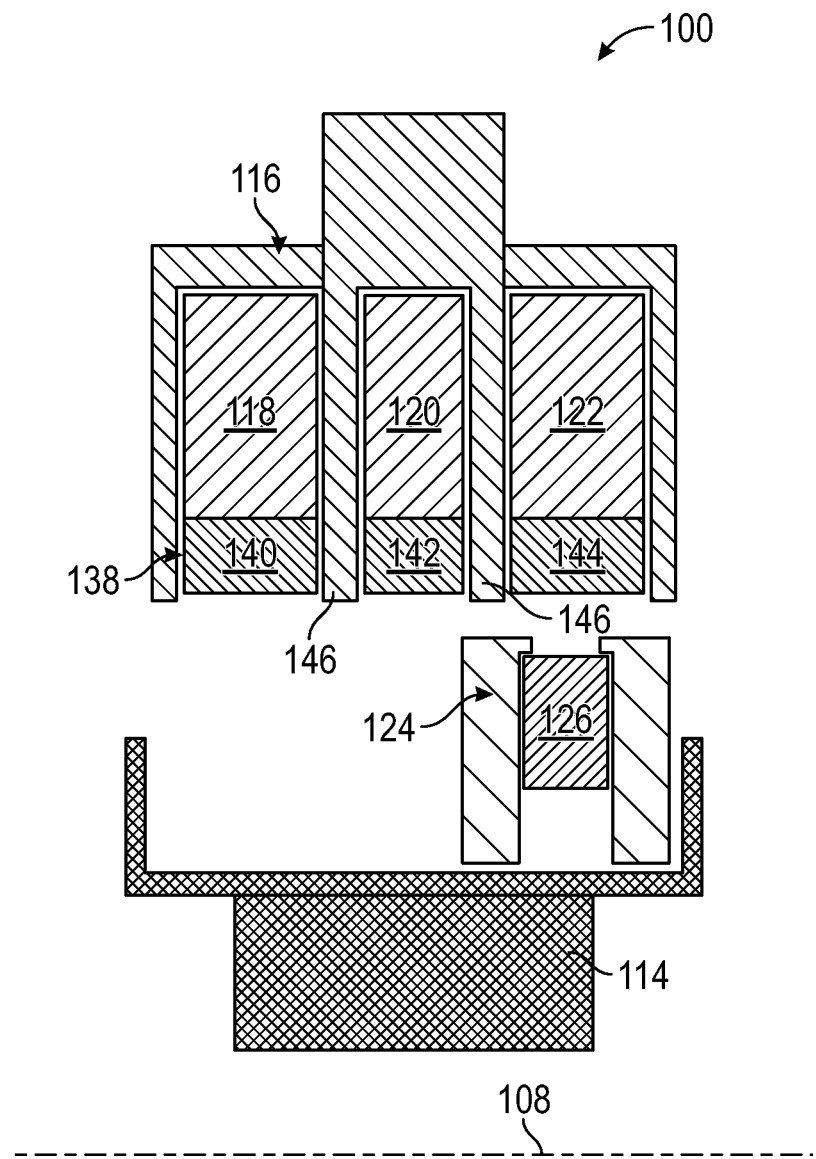
FIG. 5 is a schematic illustration of a multi-stable solenoid including magnetic damping components according to one aspect of the present disclosure.

FIG. 5 illustrates one non-limiting example of the multi-stable solenoid 100 that is designed to inhibit or substantially prevent overshoot of the armature 124 when firing from one of the first end position 128 and the second end position 132 to the center detent position 130. In general, the multi-stable solenoid 100 may include one or more magnetic dampers 138 arranged along a travel path of the armature 124. In the illustrated non-limiting example, the multi-stable solenoid 100 may include a first damping ring 140, a second damping ring 142, and a third damping ring 144. The first damping ring 140, the second damping ring 142, and the third damping ring 144 may be arranged at least partially within the housing 116. In the illustrated non-limiting example, the first damping ring 140, the second damping ring 142, and the third damping ring 144 may be arranged at an end of the housing 116 that is radially adjacent to the armature 124, with the housing 116 including radially-extending arms, or fingers, 146 that axially separate the first damping ring 140, the second damping ring 142, and the third damping ring 144. The first wire coil 118 may be enclosed by the housing 116 and the first damping ring 140, the second wire coil 120 may be enclosed by the housing 116 and the second damping ring 142, and the third wire coil 122 may be enclosed by the housing 116 and the third damping ring 144.

In some non-limiting examples, the first damping ring 140, the second damping ring 142, and the third damping ring 144 may be fabricated from an electrically-conductive, non-ferromagnetic material. In some non-limiting examples, the first damping ring 140, the second damping ring 142, and the third damping ring 144 may be circumferentially conductive to form a closed conductive path (e.g., electrically conductive in a closed path that travels circumferentially around the center axis 108).

Generally, a speed- or velocity-dependent magnetic damping force may be generated on the ring armature 124 as is travels between the first end position 128, the center detent position 130, and the second end position 132. As the armature 124 and the permanent magnet 126 move between the stable positions, a changing magnetic field is generated relative to the one or more magnetic dampers 138. This changing magnetic field induces currents inside the one or more magnetic dampers 138 and develops the resulting opposing magnetic damping force. By adding in the first damping ring 140, the second damping ring 142, and the third damping ring 144 along the travel path of the armature 124, the magnetic damping force generated on the armature 124 may be increased (when compared to a configuration excluding the damping rings) and the magnitude and direction of the damping force may aid in inhibiting or substantially preventing the ring armature 124 from overshooting when firing to the center magnetic detent position 130. In addition, the magnitude and direction of the damping force provided by the combined effects of the first damping ring 140, the second damping ring 142, and the third damping ring 144 may also aid in slowing down, or reducing an impact force, as the armature 124 travels to the first end position 128 or the second end position 132.

Figure 6:
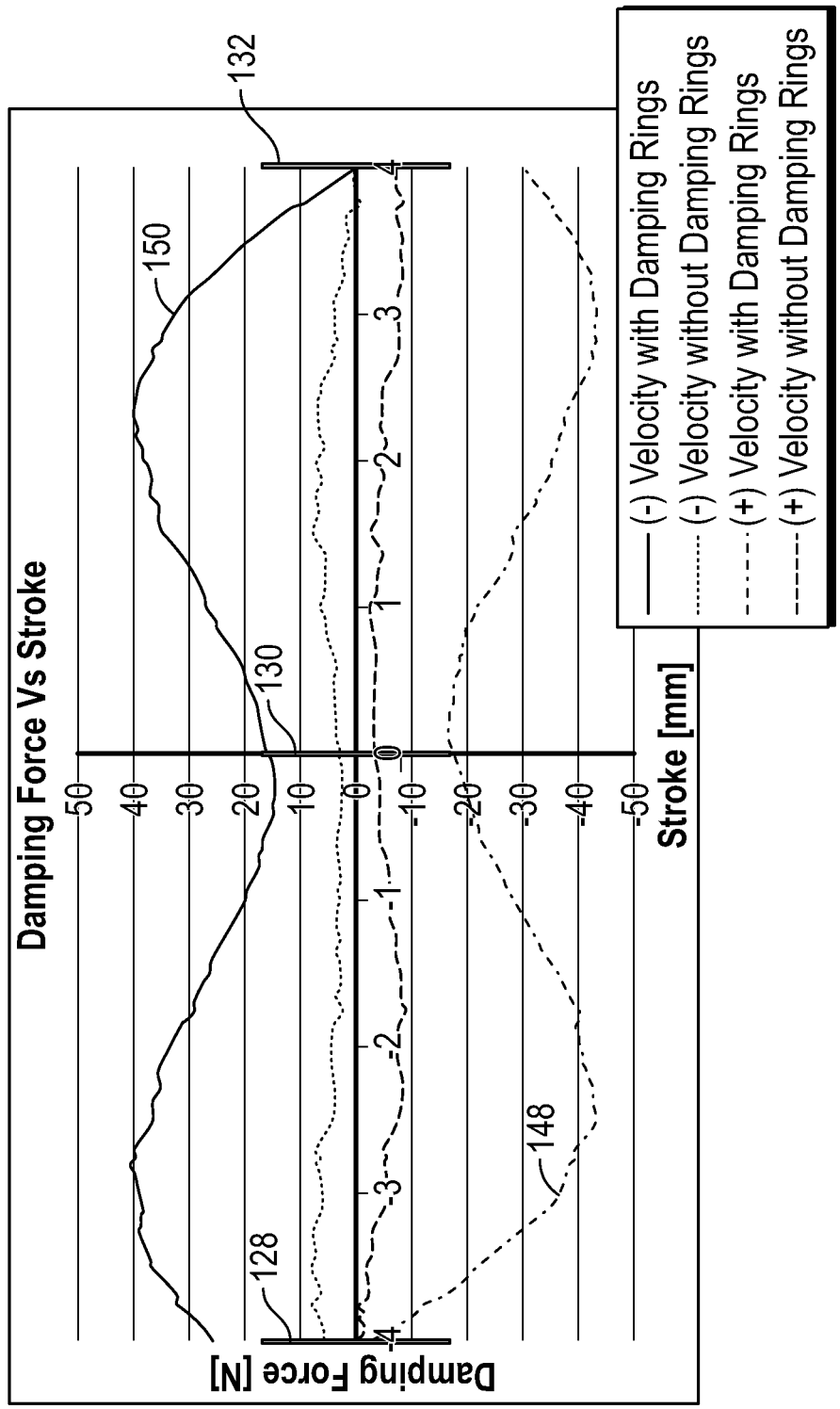
FIG. 6 is a graph illustrating a magnetic damping force as a function of stroke with and without the magnetic damping components for various armature speeds.

As illustrated in FIG. 6, the use of the first damping ring 140, the second damping ring 142, and the third damping ring 144 may substantially alter the magnetic damping force characteristics of the multi-stable solenoid 100. For example, the first damping ring 140, the second damping ring 142, and the third damping ring 144 may alter the damping force to be generally parabolic in shape for a given firing condition. For example, when firing from the first end position 128 toward the center detent position 130 (i.e., curve 148), the magnetic damping force may initially increase (in absolute value) and then decrease as the ring armature 124 reaches the center detent position 130. As illustrated in FIG. 6, the damping force of curve 148 is negative in value, which corresponds with acting in a direction that is axially from right to left. When the armature 124 is moving from the first end position 128 to the center detent position 130, the armature 124 displaces in an axial direction that is from left to right. As such, the damping force generated by the one or more damping rings 138 acts in a direction that opposes the movement direction of the armature 124.

Similarly, when firing from the second end position 132 to the center detent position 130 (i.e., curve 150), the magnetic damping force may initially increase (in absolute value) and decrease as the ring armature 124 reaches the center detent position 130. As illustrated in FIG. 6, the damping force of curve 150 is positive in value, which corresponds with acting a direction that is axially from left to right. When the armature is moving from the second end position 132 to the center detent position 130, the armature 124 displaces in an axial direction that is from right to left. Again, the damping force generated by the one or more damping rings 138 acts in a direction that opposes the movement direction of the armature 124. In this way, for example, the magnetic damping force generated by the use of the first damping ring 140, the second damping ring 142, and the third damping ring 144 may act to limit the momentum of the armature 124 as is travels to the center detent position 130 from one of the first end position 128 and the second end position 132. As such, the armature 124 may be inhibited or substantially prevented from excessively overshooting past the center of the magnetic detent position 130 to ensure efficient and accurate operation of the multi-stable solenoid 100.

As described herein, the damping force generated by the one or more damping rings 138 may be the result of a changing magnetic field that is generated by movement of the armature 124 relative to the one or more damping rings 138. The generation of the damping force may therefore be initiated by the movement of the armature 124 relative to at least one of the first damping ring 140, the second damping ring 142, and the third damping ring 144, which is reflected in FIG. 6. For example, the magnitude of the damping force on the curve 148 at the first end position 128 may be zero, and the increase (in absolute value) of the damping force occurs once the armature 124 begins to move toward the center detent position 130. Similarly, the magnitude of the damping force on the curve 150 at the second end position 132 may be zero, and the increase (in absolute value) of the damping force occurs once the armature 124 begins to move toward the center position 130. As such, the magnitude of the damping force generated by the one or more damping rings 138 may be speed- or velocity-dependent. That is, if the armature 124 is not moving (e.g., zero velocity), the damping force may not be generated. Once the armature 124 begins to move (i.e., absolute value of velocity is greater than zero), the one or more damping rings 138 may generate the damping force in a direction that opposes the movement direction of the armature 124 with a magnitude the is related to the absolute value of the speed of the armature 124.

Figure 7:
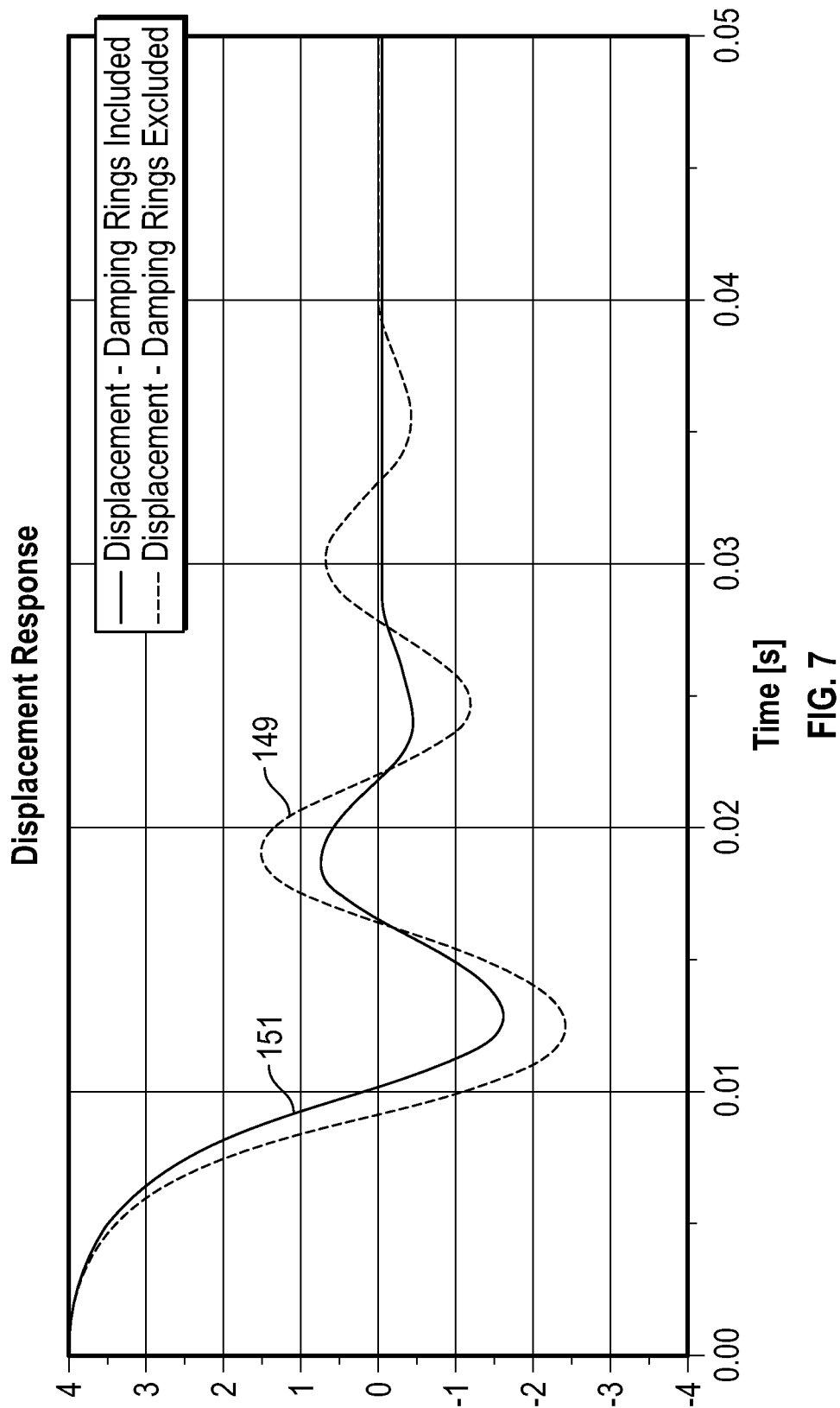
FIG. 7 is a graph illustrating armature position as a function of time for configurations of the solenoid of FIG. 6 with and without the damping components.

FIG. 7 further illustrates the benefits of the one or more magnetic dampers 138. As illustrated in FIG. 7, the overshoot (i.e., travel past the center detent position 130) is greater without the use of the one or more magnetic dampers 138 (curve 149), and the ring armature 124 takes a longer time to reach a stable state at the center detent position 130. In other words, the inclusion of the one or more magnetic dampers 138 (curve 151) reduces the overshoot past the center detent position 130 and becomes stable at the center detent position 130 faster.

In addition to the desirable effects with respect to overshoot of the armature 124, the use of the first damping ring 140, the second damping ring 142, and the third damping ring 144 also provide a solution that is mostly independent of magnetic saturation of the housing (i.e., the damping force is not affected by magnetic saturation). Further, no changes are necessary in the other ferromagnetic components of the multi-stable solenoid 100 to accommodate the first damping ring 140, the second damping ring 142, and the third damping ring 144. For example, the shape and size of the housing 116, and the other magnetic components within the multi-stable solenoid 100 may remain unchanged, which leaves the magnetostatic characteristics unaltered. Thus, the magnetostatic requirements of the multi-stable solenoid 100 for a given application can be decoupled from the dynamic requirements, which significantly reduces complexity of the design process. Further, the magnetic material efficiency of the design can be unaltered by the use of the first damping ring 140, the second damping ring 142, and the third damping ring 144.

Within this specification embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

Thus, while the invention has been described in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein.

Various features and advantages of the invention are set forth in the following claims.

I claim:

1. A solenoid, comprising:
a wire coil;
an armature including a permanent magnet, wherein the armature is moveable between two or more stable positions in response to selective energization of the wire coil; and
one or more magnetic dampers arranged along a travel path of the armature,
wherein the one or more magnetic dampers are configured to generate a magnetic damping force in a direction that opposes movement of the armature to restrict overshoot when the armature travels to one of the two or more stable positions, wherein the one or more magnetic dampers are electrically conductive and non-ferromagnetic.

2. The solenoid of claim 1, further comprising a housing.

3. The solenoid of claim 2, wherein the wire coil is arranged within the housing.

4. The solenoid of claim 3, wherein the wire coil is formed from a single, continuous coil that is separated into one or more wire coil bays that are axially separated from one another.

5. The solenoid of claim 4, wherein the housing includes one or more fingers that axially separate the one or more wire coil bays.

6. The solenoid of claim 3, wherein the wire coil comprises one or more individual wire coils axially separated from one another.

7. The solenoid of claim 6, wherein the housing includes one or more fingers that axially separate the one or more individual wire coils.

8. The solenoid of claim 2, wherein the housing is fabricated from a ferromagnetic material.

9. The solenoid of claim 2, wherein the one or more magnetic dampers are at least partially arranged within the housing.

10. The solenoid of claim 1, wherein the two or more stable positions include a first end position, a center detent position, and a second end position.

11. The solenoid of claim 10, wherein the armature is stable in at least one of the first end position, the center detent position, and the second end position with the wire coil de-energized.

12. The solenoid of claim 1, wherein the one or more magnetic dampers are circumferentially conductive to form a closed conductive path.

13. The solenoid of claim 1, wherein the armature is comprised of one or more ferromagnetic components in addition to the permanent magnet.

14. The solenoid of claim 1, wherein a magnitude of the magnetic damping force is dependent on a velocity of the armature.

15. A solenoid, comprising:
a wire coil;
an armature including a permanent magnet, wherein the armature is moveable between two stable positions in response to selective energization of the wire coil; and
two magnetic dampers, each of the two magnetic dampers is arranged along a travel path of the armature at a respective one of the two stable positions, wherein the two magnetic dampers are configured to generate a magnetic damping force in response to relative movement between the armature and at least one of the two magnetic dampers, and wherein a direction of the magnetic damping force is opposite to a movement direction of the armature to restrict overshoot when the armature travels to one of the two stable positions.

16. The solenoid of claim 15, wherein a magnitude of the magnetic damping force is dependent on a velocity of the armature.

17. The solenoid of claim 15, wherein the two stable positions are two of a plurality of stable positions that includes a first end position, a center detent position, and a second end position, and wherein the two magnetic dampers are two of a plurality of magnetic dampers.

18. The solenoid of claim 17, wherein the armature is stable in at least one of the first end position, the center detent position, and the second end position with the wire coil de-energized.

19. The solenoid of claim 15, wherein the two magnetic dampers are electrically conductive and non-ferromagnetic, and wherein the two magnetic dampers are circumferentially conductive to form a closed conductive path.

* * * * *